United States Patent
Kandaswamy et al.

(10) Patent No.: US 11,283,688 B2
(45) Date of Patent: Mar. 22, 2022

(54) DELAYED RECOMPUTATION OF FORMAL NETWORK TOPOLOGY MODELS BASED ON MODIFICATIONS TO DEPLOYED NETWORK TOPOLOGIES

(71) Applicant: Cisco Technology, Inc., San Jose, CA (US)

(72) Inventors: Sridar Kandaswamy, San Jose, CA (US); Sebastian Jeuk, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 16/878,370

(22) Filed: May 19, 2020

(65) Prior Publication Data
US 2021/0367849 A1 Nov. 25, 2021

(51) Int. Cl.
*H04L 12/751* (2013.01)
*H04L 41/12* (2022.01)
(Continued)

(52) U.S. Cl.
CPC .......... *H04L 41/12* (2013.01); *H04L 41/0893* (2013.01); *H04L 41/145* (2013.01); *H04L 45/02* (2013.01)

(58) Field of Classification Search
CPC ... H04L 41/12; H04L 41/0893; H04L 41/145; H04L 45/02; H04L 43/16; H04L 41/082
See application file for complete search history.

(56) References Cited

U.S. PATENT DOCUMENTS 8,005,879 B2    8/2011  Bornhoevd et al.
9,124,507 B1 *  9/2015  Sella ................. H04L 45/02
(Continued)

FOREIGN PATENT DOCUMENTS

CN    102868733    1/2013
CN    107819662    3/2018

OTHER PUBLICATIONS

Office Action for U.S. Appl. No. 16/901,558, dated May 11, 2021, Jeuk, "Machine-Learning Infused Network Topology Generation and Deployment", 9 Pages.
(Continued)

*Primary Examiner* — Oanh Duong
(74) *Attorney, Agent, or Firm* — Lee & Hayes, P.C.

(57) ABSTRACT

Techniques are described herein for generating and modifying formal network topology models, and deploying network topologies based on the formal models across multiple workload resource domains. A topology deployment system may receive modification data for a deployed network topology, and analyze the modification data to determine whether the associated formal network topology model is to be recomputed. In some examples, modifications to a deployed network topology that do not impact operational performance or compromise functional equivalence with the underlying logical model, need not trigger a recomputation of the network topology model immediately and could be delayed. Modifications to deployed network topologies that do not trigger recomputations of the formal network topology model may be stored and tracked, so that subsequent recomputations of the model may incorporate the pending modifications.

20 Claims, 9 Drawing Sheets

(51) Int. Cl.
*H04L 41/0893* (2022.01)
*H04L 41/14* (2022.01)
*H04L 45/02* (2022.01)

(56) References Cited

U.S. PATENT DOCUMENTS

| | | | |
|---|---|---|---|
| 10,148,551 B1* | 12/2018 | Wood | H04L 41/12 |
| 10,171,383 B2 | 1/2019 | Johnston et al. | |
| 10,567,230 B1* | 2/2020 | Song | H04L 41/12 |
| 10,691,504 B2 | 6/2020 | Liu et al. | |
| 10,693,711 B1* | 6/2020 | Garg | H04L 41/0631 |
| 10,872,029 B1 | 12/2020 | Bawcom | |
| 2003/0063571 A1 | 4/2003 | Ikeda et al. | |
| 2006/0149782 A1 | 7/2006 | Yeh et al. | |
| 2013/0091283 A1* | 4/2013 | Omar | H04L 41/0893 709/226 |
| 2014/0192676 A1 | 7/2014 | Sullivan | |
| 2015/0188989 A1 | 7/2015 | Chaliparambil et al. | |
| 2016/0094383 A1* | 3/2016 | Wang | G06F 16/951 709/221 |
| 2016/0188355 A1 | 6/2016 | Cao et al. | |
| 2016/0191391 A1* | 6/2016 | Wood | H04L 45/50 370/235 |
| 2016/0321378 A1 | 11/2016 | Kagan et al. | |
| 2016/0344772 A1* | 11/2016 | Monahan | G06F 21/577 |
| 2017/0048110 A1* | 2/2017 | Wu | H04L 41/12 |
| 2017/0104636 A1 | 4/2017 | Vora et al. | |
| 2017/0127427 A1* | 5/2017 | Claridge | H04W 4/025 |
| 2017/0207980 A1* | 7/2017 | Hudis | H04L 41/145 |
| 2017/0317780 A1* | 11/2017 | Wood | H04B 10/27 |
| 2019/0220321 A1 | 7/2019 | Yang | |
| 2019/0363938 A1* | 11/2019 | Liebinger Portela | H04L 41/12 |
| 2020/0259715 A1 | 8/2020 | Schermann et al. | |
| 2020/0358804 A1 | 11/2020 | Crabtree et al. | |
| 2021/0075816 A1 | 3/2021 | S | |
| 2021/0367852 A1 | 11/2021 | Kandaswamy et al. | |
| 2021/0392049 A1 | 12/2021 | Jeuk et al. | |
| 2021/0409277 A1 | 12/2021 | Jeuk et al. | |

OTHER PUBLICATIONS

Antonescu, Alexandru et al., "Dynamic Topology Orchestration for Distributed Cloud-Based Applications", Dec. 2012, pp. 1-9.

Office Action for U.S. Appl. No. 16/915,706, dated Nov. 12, 2021, Jeuk, "Generation and Deployment of Inherited Network Topology Models", 24 pages.

Office Action for U.S. Appl. No. 16/901,558, dated Dec. 1, 2021, Jeuk, "Machine-Learning Infused Network Topology Generation and Deployment ", 13 pages.

* cited by examiner

DELAYED RECOMPUTATION OF FORMAL NETWORK TOPOLOGY MODELS BASED ON MODIFICATIONS TO DEPLOYED NETWORK TOPOLOGIES

TECHNICAL FIELD

The present disclosure relates generally to generating and deploying computing and/or network topologies across multiple workload resource domains. In particular, the present disclosure relates to recomputation of network topology models based on modifications to associated deployed network topologies.

BACKGROUND

Cloud computing involves using a network of servers hosted remotely on the Internet, rather than local servers or personal computers, to store, manage, and process data. Cloud computing networks for large-scale systems commonly may use deployment models, in which private clouds and/or on-premise infrastructures may be allocated for storing or processing private and secure data, while one or more public clouds may be used for storing or process other non-secure system data. Such computing environments, which may be referred to as multiple workload resource domain environments (or multi-pool environments) may include multi-cloud environments, hybrid cloud environments, multi-datacenter environments, multi-edge computing environments, and/or any combination thereof. Multiple workload resource domain environments may allow architectural flexibility and scalability with respect to processing demand, as well as allowing integration of specialized computational models.

When designing network topologies for deployment within a public cloud, private cloud, on-premise datacenter, or the like, a network topology model is generated based on a logical model and/or constraints provided by system administrators and/or tenants. However, for network topologies spanning multiple workload resource domain environments, generation, deployment, and maintenance of the topology may be complex and costly, due to the potential functional disparities between the different computing environments, dynamic system changes or errors that may occur within the computing environments after deployment of the topology, and splitting of system management responsibilities between the public cloud providers, private cloud providers, on-premise infrastructure administrators, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
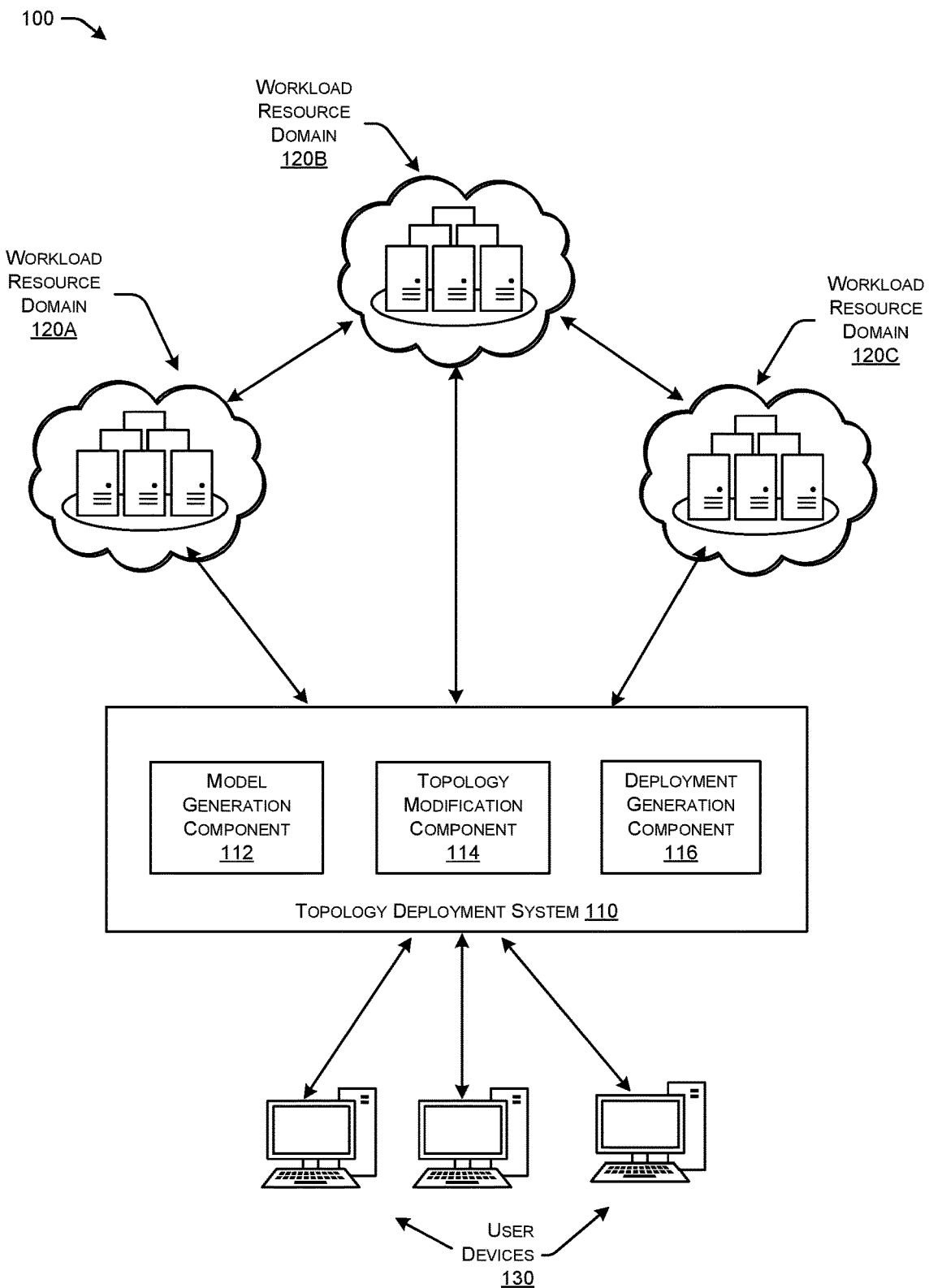
FIG. 1 depicts a computing environment including multiple workload resource domains and a topology deployment system configured to generate, deploy, and modify network topologies.

This disclosure describes techniques for generating and modifying network topology models, and deploying network topologies based on the logical models across multiple workload resource domains. A topology deployment system may receive modification data for a deployed network topology, and analyze the modification data to determine whether the associated network topology model is to be recomputed. In some examples, modifications to a deployed network topology that do not impact operational performance or compromise functional equivalence with the underlying logical model, need not trigger a recomputation of the network topology model. Modifications to deployed network topologies that do not trigger recomputations of the network topology model may be stored and tracked, so that subsequent recomputations of the model may incorporate multiple pending modifications.

In some examples, a topology deployment system may receive data indicating that an existing network topology deployed across the workload resource domains has been (or will be) modified. For instance, modifications to a deployed network topology may be based on changes made by a user (e.g., a tenant, system administrator, cloud or resource pool administrator, etc.) to the associated logical topology model, or to the constraints that have been defined for the topology. In other instances, modifications to a deployed network topology may be based on an event occurring with a workload resource domain (e.g., a cloud or datacenter), such as outage in a particular region of the workload resource domain, or a change to a service level agreement (SLA) associated with a workload resource domain and one or more tenants.

The topology deployment system may analyze the modification data and details for the deployed network topology, to determine whether or not a recomputation of the underlying network topology model is performed in response to the modification of the deployed topology. For instance, in response to a change in a deployed network topology, the topology deployment system may evaluate the change based on the deployment constraints and the resource inventories for the workload resource domains, and then may recompute the underlying network topology model based on the change. By recomputing the network topology model, the topology deployment system may assure that the network topology model maintains functional equivalence with the logical model. However, recomputation of the network topology model may require significant computational overhead, including determination and testing of new mappings between the nodes in the logical model and the formal network topology model, generation and deploying of the new network topology across the workload resource domains, optimization of the new network topology and verification of functional equivalence between the new network topology and the logical model. As a result, frequent recomputation of the network topology model may impact the performance of the topology deployment system and the actual deployment.

Accordingly, in other instances, the topology deployment system may analyze a modification to a deployed network topology and determine that the network topology model need not be recomputed based on the modification, thereby improving the performance of the deployed topology and avoid potential disruptions to the deployment. In various examples, the topology deployment system may use a rules engine and/or trained machine-learning models to analyze modifications to deployments, in order to determine which modifications do and do not require corresponding recomputation of the network topology model. For instance, the topology deployment system may determine that certain modifications within the deployment are simple, incremental and/or localized (e.g., functionally and/or geographically). For such modifications, the topology deployment system may store and track the modifications in a pending modification listing associated with the network topology model, rather than performing a full recomputation of the network topology model as described above.

Accordingly, the techniques described herein may improve techniques for at least (i) evaluating modifications to network topologies deployed across multiple workload resource domains, and (ii) recomputing network topology models, immediately or on a delayed basis, to maintain functional equivalence and performance for the deployed topologies. Specifically, the improved techniques described herein may include analysis and approximation of modifications to deployed network topologies, which may reduce overhead by requiring few recomputations of the network topology models, weighting (e.g., using an approximation equivalence level) for modifications to dynamically or manually adjust the level of approximation associated with recomputations of network topology models, and analysis and approximation of modifications to deployed network topologies over time to perform recomputation determinations for network topology models for frequently performed modifications.

The techniques described herein may be performed as methods, or by computing devices and/or system having processors and memory units, or may be embodied in non-transitory computer-readable medium storing processor-executable instructions that, when executed by one or more processors, performs the techniques described.

Example Embodiments

This disclosure describes techniques for generating and modifying network topology models, and deploying network topologies based on the models across multiple workload resource domains. Network topologies may refer to distributed computing systems in which a number of different nodes are individually designed and/or configured to perform particular functionality, and the various nodes may coordinate and communicate with other nodes to provide the overall functionality of the network topology. The various nodes within a network topology may include, for example, nodes that are specialized and dedicated as network nodes, computing nodes, storage nodes, operating systems, software applications and services, and/or virtual computing machines or instances, etc. Different types and configurations of nodes may include specialized hardware and/or software components to perform the node functionality. Network nodes, for example, may include computing devices such as routers, servers, switches, load balancers, wireless access points, etc., running various software versions and/or having other attributes. Storage nodes may include various types of dedicated storage systems, compute nodes may include physical servers or other dedicated processing devices, and so on. Thus, network topologies may be used to implement enterprise systems and other large-scale computer systems.

In some embodiments, a network topology may be distributed across multiple different workload resource domains. A workload resource domain (which also may be referred to as a resource pool) may refer to any computing environment and/or computing resource container, such as public cloud computing environments, private cloud computing environments, or on-premise datacenters. Network topologies deployed across multiple workload resource domains (which also may be referred to as multi-pool network topologies) may include hybrid network topologies, multi-cloud network topologies, multi-datacenter network topologies, multi-edge network topologies, and any combination thereof in which the topology uses one or more nodes distributed across multiple different workload resource domains. Such multi-pool network topologies may provide potential advantages when designing and deploying large-scale computing systems. For example, certain network topologies may use deployment models in which private clouds and/or on-premise infrastructures are allocated to store and process private and secure data, while one or more public clouds may be used to store or process other non-secure system data. Multi-pool network topologies also may allow for architectural flexibility and scalability with respect to changes in processing demand over time, as well as allowing integration of specialized computational models.

In some examples, a modification may be received for a network topology deployed across multiple workload resource domains, and a topology deployment system may analyze and process the modification for recomputing the associated network topology model for the deployment, either immediately or on a delayed basis, based on an analysis of the deployment modification. Prior to the modification of the deployment, a network topology model initially may be generated based on an underlying logical model, along with deployment constraints and/or resource inventory data. The logical (or intent-based) topology model initially may be created and validated, and then used for the physical realization (or deployment) of a network topology that is functionally equivalent to the logical model. During deployment within the multi-pool (e.g., multiple workload resource domain) environment, the network topology model may be optimized for performance and resource usage, and verified for functional equivalence with the logical model. The physical deployment of the network topology model may use internetworking devices and virtual processing resources. Formal methods may be used to validate the correctness of the logical model without the need for test-based verification, and deployment generation instructions may be used automatically generate a physical network topology for the deployment within the multi-pool network topology, including a set of deployment instructions that may be transmitted between gateways in different workload resource domains.

Following the initial deployment of a multi-pool network topology, the deployment may be modified based on events occurring within the workload resource domains of the multi-pool deployment and/or based on user-initiated changes from a tenant, administrator, or service provider. For instance, a network topology deployment computer system (or topology deployment system) may receive data identifying a first modification to a network topology deployed across a plurality of workload resource domains, wherein the network topology is based on a network topology model, and wherein the network topology comprises a plurality of nodes including at least one node operating in each of the plurality of workload resource domains. The topology deployment system may determine, based at least in part on an analysis of the first modification, that the network topology model is not to be recomputed in connection with the first modification to the deployed network topology. Based on the determination, the topology deployment system may store data representing the first modification in a listing of pending modifications to the network topology model.

Continuing the previous example, the topology deployment system may receive data identifying a second modification to the deployed network topology. The topology deployment system may determine, based at least in part on an analysis of the second modification, that the network topology model is to be recomputed in connection with the second modification to the deployed network topology. Based on the determination that the network topology model is to be recomputed, the topology deployment system may retrieve the data representing the first modification from the listing of pending modifications to the network topology model, and recompute the network topology model, based at least in part on the first modification and the second modification. In some instances, the determination that the network topology model is to be recomputed can be based on the analysis of the first modification and the analysis of the second modification.

Several techniques are described herein for analyzing deployment modifications to determine whether (and/or when) a network topology model should be recomputed (e.g., immediately in response to each deployment modification, or on a delayed basis after multiple deployment modifications). In some examples, the analysis of a modification of a network topology deployment can comprise comparing the modification to a predetermined list of types of network topology modifications. A predetermined list of network topology modification types may be determined by a tenant, administrator, etc., or may be determined using a heuristic approach to identify patterns and correlations for modification types. For instance, the topology deployment system may generate the predetermined list of network topology modification types using a machine-learned model trained to identify a network topology modification type associated with an operational performance change of the deployed network topology. Additionally or alternatively, the topology deployment system may receive modification data for the deployed network topology that includes metadata provided by a user (e.g., a tenant user, administrator user, cloud service provider user, etc.) associated with the modification to the deployed network topology, and then may use the metadata to determine whether (and/or when) the network topology model should be recomputed. In some instances, the topology deployment system may determine a number of nodes within the deployment that are affected by the modification, and may determine and analyze various characteristics of the affected nodes (e.g., estimated usage time, subnetwork, computing resource or architecture differences between the source and the new destination for the node).

In the various examples and embodiments described herein, multi-pool network topologies may include any number of nodes, and different types of nodes (e.g., compute nodes, networking nodes, storage nodes, software and virtual machine nodes, etc.), which may be deployed across various workload resource domains such as public or private clouds, on-premise data centers, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a computing environment 100 including a topology deployment system 110, multiple workload resource domains 120, and one or more user devices 130. As described in more detail below, the topology deployment system 110 may be configured to generate, deploy, and modify network topology models and associated deployments within the computing environment 100.

As noted above, multi-pool network topologies may refer to large-scale computing systems and/or solutions that are implemented by several different nodes of various different types (e.g., network nodes, storage nodes, compute nodes, software application or service nodes, virtual machines or instances, etc.), which can be deployed across multiple different workload resource domains, and which can interact and communicate to provide the functionality of the overall topology. Workload resource domains 120 may refer to a dedicated pool of computer resources from which nodes may be allocated. By way of example only, workload resource domain 120A may correspond to a first public cloud computing environment, workload resource domain 120B may correspond to a second public cloud computing environment or to a separate private cloud computing environment, and workload resource domain 120C may correspond to another public or private cloud computing environment or to an on-premise datacenter. Although only three workload resource domains 120 are shown in this example, it is contemplated that a network topology may be deployed across any number of different public clouds, public clouds, private clouds, on-premise datacenters, and/or other resource pools, in various examples.

In various examples, each of the workload resource domains 120 (which also may be referred to as domain infrastructures) of the multi-domain computing environment 100 may generally represent or comprise a resource pool. The resource pool of each workload resource domain 120 may comprise a data center, multiple data centers within the same enterprise, multiple data centers across enterprises, etc. As a specific example, a campus network of a school may be a type of workload resource domain 120A that is connected to a data center running in another domain infrastructure 120B by a connection through one or more networks, such as the Internet. Both of the domain infrastructures 120A and 120B may further be connected to a public cloud provider 120C as a third domain infrastructure. This is one example of the types of domain infrastructures 120 that may be interconnected to create a multi-domain environment 100. Generally, a workload resource domain 120 may comprise a set of resources that are managed, operated, and/or owned by the same or by different entities. In one specific example, the multi-domain environment 100 may comprise a multi-cloud environment that includes multiple public clouds, multiple private clouds (e.g., enterprise networks), a public cloud in combination with a private cloud/network, etc. However, the multi-domain environment 100 may also be utilized in other technologies. For instance, the multi-domain environment 100 may comprise domains of different devices in an Internet-of-Things (IoT) environments where each domain is a different grouping of IoT devices, and the domains are interconnected to form the multi-domain environment. 100. Generally, the multi-domain environment 100 may comprise groupings of devices in different technology areas and/or different types of devices assigned to multiple domains that are connected to each other.

In some examples, the topology deployment system 110 may be coupled directly or indirectly to a multi-pool network (e.g., a multi-cloud network) that may include the Internet, one or more private clouds, public clouds, and/or other resource pools (e.g., on-premise datacenters). The topology deployment system 110 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

The different nodes types that may operate within a multi-pool network topology (e.g., network nodes, compute nodes, storage nodes, software application or service nodes, virtual machine instance nodes, etc.) each may correspond to or may be executed on one or more computers. As used herein, a "computer" may refer to one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special purpose computing devices.

In some examples, the topology deployment system 110 may include one or more of a model generation component 112, a topology modification component 114, and/or a deployment generation component 116. As described below in more detail, the model generation component 112 may determine network topology models (including initial network topology models and modified models) for network deployment, based on various inputs such as a logical (or intent-based) topology input, resource inventories of the workload resource domains 120, and/or resource constraints provided by a user (e.g., system administrator or tenant user). The model generation component 112 may provide an initial network topology model to the deployment generation component 116 for physical deployment within the workload resource domains 120. The deployment generation component 116 may include various subcomponents configured to verify and optimize a network topology based on the model, and to generate deployment instructions programmed or configured to generate the network topology within the workload resource domains 120.

After the deployment of a network topology within the workload resource domains 120, the topology modification component 114 may receive data indicating that a deployed network topology (also referred to as a deployment) has been or will be modified. The topology modification component 114 may analyze the deployment modification using various techniques described herein, to determine whether or not the network topology model associated with the deployment should be recomputed as well. As noted above, recomputing the network topology model in response to a deployment modification can assure that the network topology model maintains functional equivalence with the logical model, and also can provide improvements in resource usage optimization and performance for the deploy. However, frequent recomputation of the network topology model can require significant computational overhead. For example, for each recomputation of the network topology model, topology deployment system 110 may determine and test of new mappings, generate and deploy the new network topology, optimize and verify of functional equivalence between the new topology and the logical model. Accordingly, the topology modification component 114 may determine in which instances the network topology model should be recomputed in response to a deployment modification, and in which instances the network topology model should not be recomputed.

Although not shown in FIG. 1 so as not to obscure the elements depicted therein, the computing environment 100 (which also may be referred to as a multi-pool network or environment) may include any combination of data communication networks through which the topology deployment system 110, workload resource domain(s) 120, and user devices 130 may communicate. The communication networks may include local area networks, wide area networks, internetworks or internets, using any of wireline or wireless links, including terrestrial or satellite links. The networks may be implemented by any medium or mechanism that provides for the exchange of data between the various elements of FIG. 1. The various elements of FIG. 1 may also have direct (wired or wireless) communications links. The workload resource domains 120 (e.g., private cloud network(s), public cloud network(s), on-premise datacenter(s), etc.), topology deployment system 110, and other elements of the computing environment 100 each can include a compatible interface and can be programmed or configured to use standardized protocols for communication across the networks, such as TCP/IP, Bluetooth, and higher-layer protocols such as HTTP, TLS, and the like.

Each workload resource domain 120 may be implemented using a server-class computer or other computers having one or more processor cores, co-processors, or other computers. Workload resource domains 120 may include physical server computers and/or a virtual server instances stored in a datacenter, such as through cloud computing. Additionally or alternatively, workload resource domains 120 such as public and/or private cloud networks, may comprise one or more applications executing on a server computer system which comprises instructions for application modeling and appliance/hardware mapping. Workload resource domains 120 may further comprise one or more network policies using notions such as templates or profiles that can be applied to different points in the computing environment 100.

In some embodiments, the topology deployment system 110 may be distributed across one or more of the workload resource domains 120, which may be bridged by a cloud service configured to integrate and virtualize various hierarchical layers of different public or private cloud networks, on-premise datacenters, etc. The individual workload resource domains 120 may comprise respective gateways (e.g., cloud gateways) that may translate cloud storage Application Programming Interfaces (APIs) to block-based storage protocols by using standard network protocols which integrate with existing applications within computing environment 100.

As noted above, the topology deployment system 110 may receive data identifying modifications to multi-pool deployments deployed across multiple workload resource domains 120. Such modifications may be events at the multiple workload resource domains 120, such as outages in a portion of the workload resource domain, modifications to the logical (intent-based) topology or to the deployment constraints, modifications to an SLA, etc. However, before any a deployment can be modified the network topology may be initially determined and deployed over the multi-pool environment. To deploy a network topology across multiple workload resource domains 120, the topology deployment system 110 may receive logical model input describing a prospective network topology and/or one or more predefined constraints to be placed on the formal/physical model. In some embodiments, the logical model input and/or the constraints may be received from a tenant user or system administrator via a user device 130. The topology deployment system 110 then may generate a network topology (e.g., a formal and/or physical network topology) for deployment in the multi-pool environment, including transmitting different sets of deployment instructions from the deployment generation component 116 to the respective gateways within the workload resource domains 120. In some embodiments, the formal (or physical) network topology determined within the model generation component 112 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some embodiments, the input received from the user device 130, describing a network topology for generation or modification, may include multiple workload resource domains 120, including at least one public cloud network associated with a public cloud network provider, and at least one private cloud network associated with an enterprise. The enterprise may include programs, service models, and applications which reside in an on-premise datacenter of the enterprise. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

A partial order reduction model checking also may be used by the model generation component 112 for model verification in some embodiments. In some examples, the constraint inputs received from network tenants, administrators, etc., via user devices 130 may specify one or more constraints upon the realization of the logical topology within individual clouds and/or datacenters of the multi-pool environment. In such cases, the model generation component 112 may optimize the intermediate topology based upon the constraint input, including automatically remapping the intermediate topology to an optimized network topology by moving functional elements (e.g., nodes or groups of nodes) from a first workload resource domain (e.g., a public cloud) in the intermediate topology, into a different workload resource domain (e.g., a private cloud or on-premise datacenter) in the final formal network topology. In some cases, constraint inputs may specify one or more attributes of a public or private cloud infrastructure.

Although the computing environment 100 may be considered a single computer network, as may each individual workload resource domain 120 within the computing environment 100. As noted above, each of the networks may include a number of network devices configured for intra- and internetwork communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The network devices may comprise physical nodes (e.g., processors, chipsets, devices, etc.), virtual nodes (virtual machines, containers, etc.), and/or any combination thereof.

Individual workload resource domains 120 may, in some cases, correspond to datacenters operating in one or more physical locations. Such datacenters (or other physical locations) may be physical facilities or buildings located across geographic areas that designated to store networked devices that are part of the corresponding workload resource domain 120. These data centers also may include various networking devices, as well as redundant or backup components and infrastructure for power supply, data communications connections, environmental controls, and various security devices. In some examples, a workload resource domain 120 may include one or more virtual data centers which are a pool or collection of cloud infrastructure resources specifically designed for enterprise needs, and/or for cloud-based service provider needs. Generally, the workload resource domains 120 (physical and/or virtual) may provide basic resources such as processor (CPU), memory (RAM), storage (disk), and networking (bandwidth). However, in some examples the network devices of the workload resource domain 120 might not be located in explicitly defined datacenters, but may operate from other physical locations.

The user devices 130 through which the topology deployment system 110 may be controlled, may comprise any type of computing device through which a user is able to interact with other devices (e.g., phones, tablets, personal computing devices, wearable devices, network devices, etc.). In some examples, users of the user devices 130 may have registered accounts with the topology deployment system 110 in order to generate and modify network topology models, and deploy network topologies within the workload resource domains 120. For instance, a topology logical design tool, constraint input tool, and/or optimization or recommendation tools can be provided by the topology deployment system 110 to authorized users at user devices 130 via a client portal (e.g., command line interface (CLI), application programming interface (API), web-based portal, etc.) and/or user interfaces. The user devices 130 may communicate with the topology deployment system 110 (and/or any other devices in the computing environment 100) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As described herein, the topology deployment system 110 may include one or more computing devices (e.g., a single device, multiple devices, network(s) of devices, etc.) comprising one or more processors configured to execute various computer-executable instructions. Additionally, topology deployment system 110 may include components, modules, etc., that are stored on non-transitory computer-readable media and configured to perform the techniques and operations described herein as being performed by the topology deployment system 110. For instance, the topology deployment system 110 may include the model generation component 112, the topology modification component 114, the deployment generation component 116, and/or any other number or arrangement of components. The components described herein are merely illustrative, and any number or configuration of components may be utilized to perform the techniques described herein.

Figure 2:
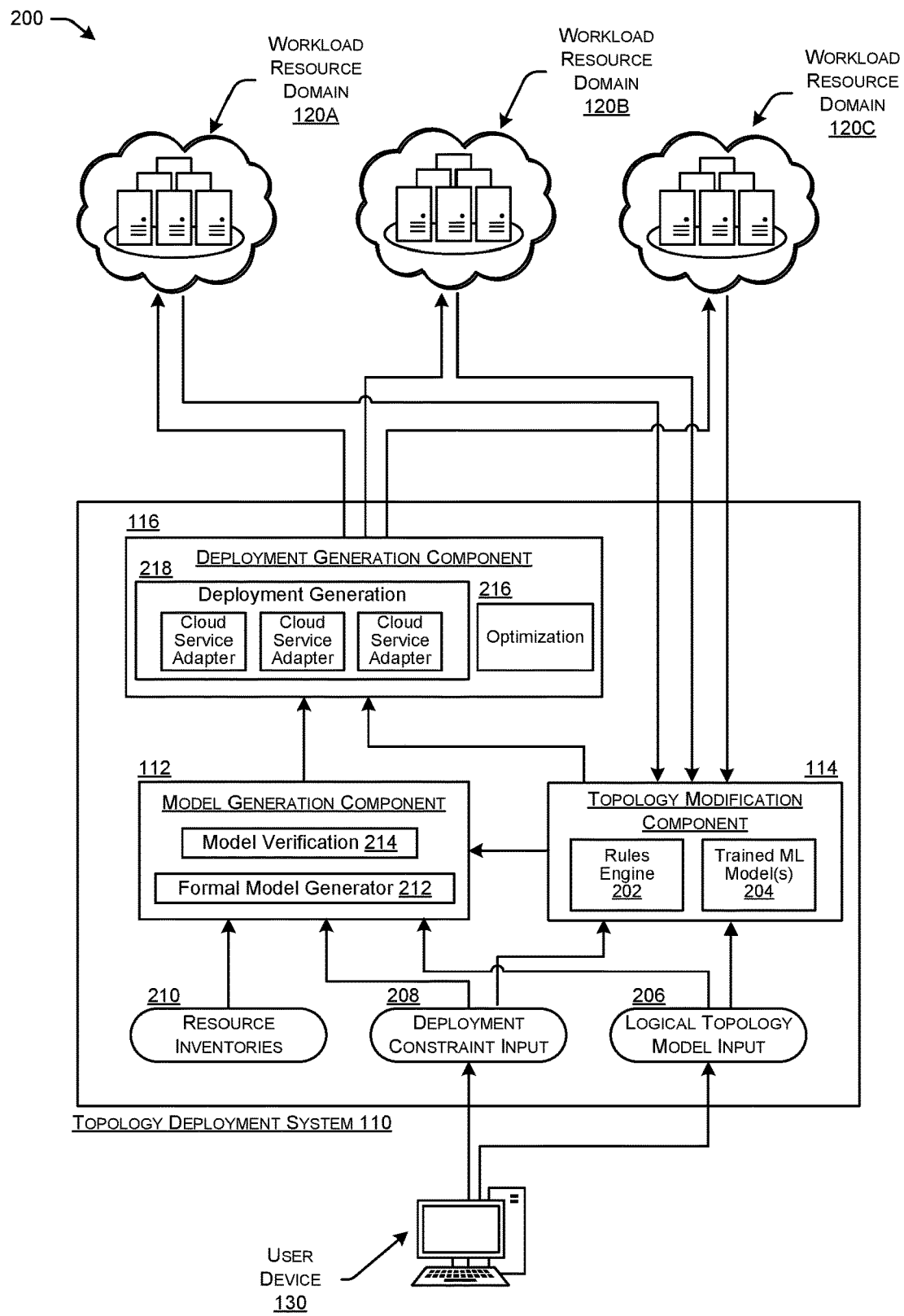
FIG. 2 depicts a system diagram of an example topology deployment system configured to generate and modify network topology models and/or to deploy network topologies across multiple workload resource domains based on the network topology models.
Figure 3:
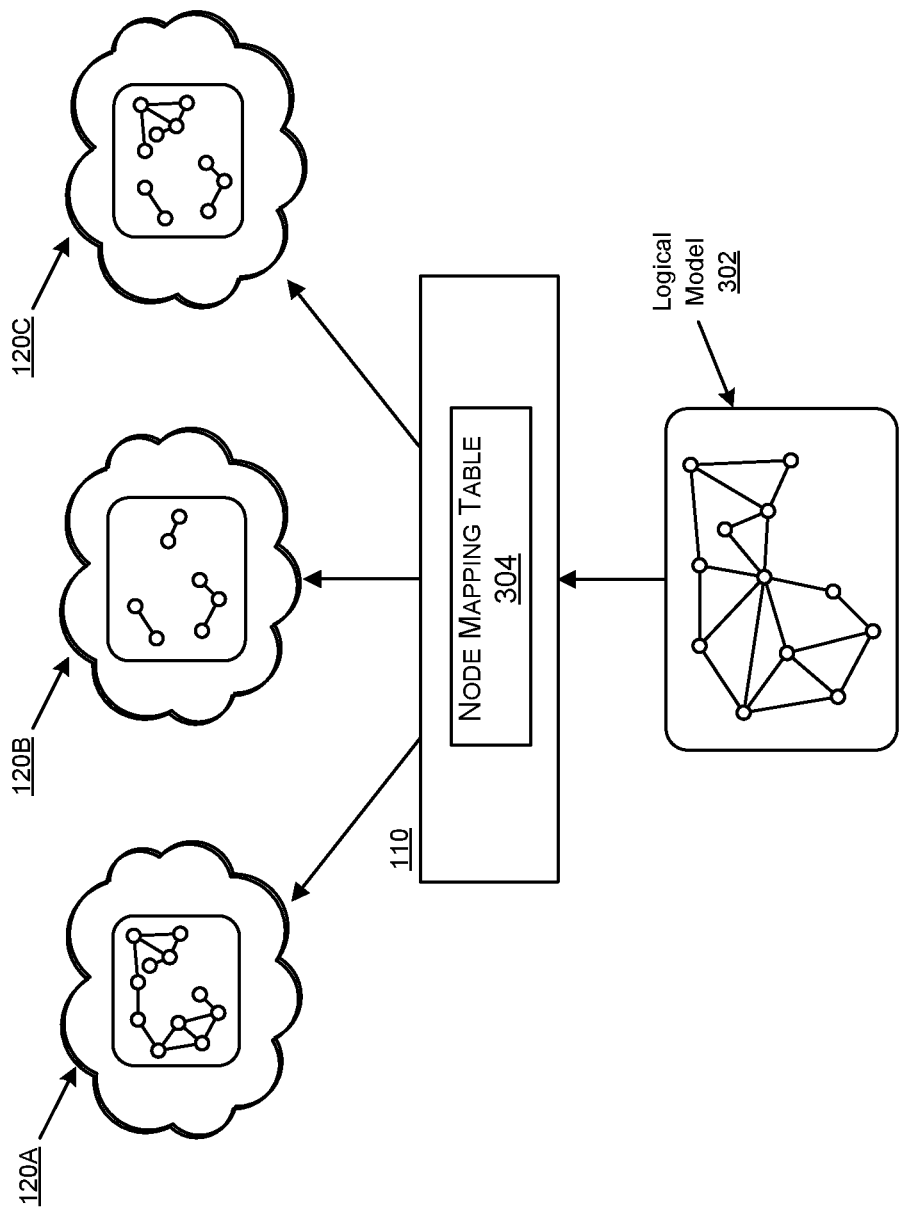
FIG. 3 depicts a diagram of an example node mapping table storing data relating to nodes in a logical model and associated nodes in a network topology model and/or deployed network topology.

FIG. 2 depicts a system diagram of an example topology deployment system configured to recompute network topology models, immediately or on a delayed basis, in response to modifications to network topologies deployed in multi-pool environments. The computing environment 200 in this example may be similar or identical the computing environment 100 discussed above in reference to FIG. 1. Computing environment 200 may include a topology deployment system 110, one or more workload resource domains 120 (e.g., public clouds, private clouds, on-premise datacenters, and/or other resource pools), and a user device 130 through which authorized users (e.g., tenants, administrators, etc.) may provide inputs to and may interact with the tools and features of the topology deployment system 110. Thus, FIG. 2 may illustrate certain embodiments of the computing environment 100 described in FIG. 1, including certain features and techniques performed by the model generation component 112, topology modification component 114, and the deployment generation component 116.

As noted above, the topology deployment system 110 may generate network topology models, deploy network topologies based on the model, and modify the network topology models and/or deployments based on data received from user device(s) 130 and/or from workload resource domain(s) 120. In some examples, the model generation component 112 may be configured to receive input data and determine network topology models for deployment across workload resource domain(s) 120. When initially determining a network topology model (also referred to as a physical model or formal model) to be deployed, the model generation component 112 may use a logical model initially provided for the network topology, one or more constraint inputs, and resource inventory data for the workload resource domains 120.

Within the model generation component 112, a formal model generator 212 may be configured to determine a modified formal model (e.g., a physical network topology for the deployment network topology across multiple workload resource domains 120). The formal model generator 212 may determine the modified formal model based on the logical topology model input 206, the deployment constraint input 208, and the resource inventories 210 for the workload resource domains 120.

Constraints 208 (also referred to as deployment constraints) may be predefined deployment conditions, specifications, or limitations that are provided by an administrator user and/or may be based on predefined policies of the network topology. Constraints may be associated with any node or groups of nodes within the deployed network topology, or with the network topology as a whole. Examples of constraints 208 may include requirements for specific nodes to be deployed on specific workload resource domains 120, requirements for groups of nodes to be deployed together on the same workload resource domain 120, requirements for minimum or maximum amounts of compute resources, storage resources, and/or network bandwidth to be provided to nodes or groups of nodes, etc. Additional examples of constraints 208 may include a specified number of virtual machine instances to be instantiated, specific types of software products or software configurations, and/or limits on pricing or cost or minimum amounts of storage, and the like. Still other examples of constraint inputs 208 may include placement of network functions within a workload resource domain 120, sensitivity level of data in a workload resource domain 120, capacity expectation of workload resource domain 120, and data traffic expectations.

Resource inventories 210 may define the available resources within each of the workload resource domains 120, which can determine the limits for the potential network topologies spanning the workload resource domains 120 (e.g., multi-cloud deployments, hybrid network deployments, etc.). The particular data within resource inventories 210, and which components collect the resource inventories and provide the data to the topology deployment system 110 may vary in different embodiments. In some instances, a resource inventory may include data specifying which workload resource domains 120 are available, the specific resources that are available within each workload resource domain 120, such as the types of network devices and capabilities, the types of storage devices, the processing units, software services, and/or the types of virtual machine images that are available.

Constraints 208 and/or resource inventories 210 may be provided by a user (e.g., tenant, service provider, or administrator) via a user device 130, or may be received from other components within the computing environment 200. Additionally or alternatively, constraints 208 resource inventories 210 may be obtained programmatically from files or configuration data that has been stored within the elements of computing environment 200. For example, network management systems within workload resource domains 120 may store or expose network element inventory data or constraints to API calls, parameterized URLs or other programmatic calls, and the topology deployment system 110 may issue such calls to the workload resource domains 120 to obtain responses, objects or download files that contain constraints 208 and/or resource inventory data 210. As shown in this example, both constraints 208 and the resource inventory data 210 may be received and used as inputs to the model generation component 112, to generate an optimized realization of the network services and other available resources. Constraints 208 and resource inventories 210 may change dynamically based on workload, system/software upgrades, and other factors that may change during the operation of the deployed network topology.

After generating a potential network topology model for deployment, based on the output from the logical model input 206, constraints 208, and resource inventories 210, the model generation component 112 may validate and/or optimize the model using the model verification component 214, which also may verify the functional equivalency of the network topology model to the logical model input 206. The validated network topology model then may be provided to the deployment generation component 116, which may use an optimization system 216 and deployment generation system 218 to physically deploy the network topology based on the model, by transmitting sets of deployment instructions to gateways within the workload resource domains 120 to implement the network topology based on the model. In some embodiments, one or more cloud service adaptors may be used to generate specific configuration instructions for the resources in the various workload resource domains 120 (e.g., private clouds, public clouds, and/or on-premise enterprise networks of which the topology deployment system 110 may be a part). The cloud service adaptors may comprise executable code that causes generation of topologies specific to different technologies or services that are available only in specific different workload resource domains 120. Examples include NMS or AWS, where NMS and AWS are two different cloud service providers each providing at least a portion of a public cloud infrastructure in which a network topology may be deployed.

The specific configuration instructions generated by the cloud service adaptors may be provided as input to optimization system 216, which in some embodiments also may receive constraint input 208 as input. In such cases, the configuration instructions may be processed based on the constraint input 208 to remap the network topology to an optimized version that attempts to fulfill as many constraints as possible that are represented in the constraint input 208. The resulting topology may be verified for functional equivalence with the input model represented in logical model input 206. In certain embodiments, model verification instructions may be programmed to implement partial order reduction techniques for verification.

In addition to generating and deploying network topology models, the topology deployment system 110 also may include a topology modification component 114 that receives and analyzes deployment modification data, and determines whether the network topology model associated with the deployment should be recomputed with the modification to the deployment, or whether the recomputation of the network topology model should be delayed. The deployment modification data received by the topology modification component 114 may include data received from a user via user device(s) 130, and/or data received from the workload resource domain(s) 120. For example, the deployment modification data received by the topology modification component 114 may identify the type of the modification, the nodes affected, the source and destination locations of one or more migrated nodes (if applicable), etc. In some instances, deployment modification data may include an update to the logical model input 206 and/or constraints 208 that may be received after the initial deployment of the network topology. Additionally or alternatively, deployment modification data may include event data received from one or more workload resource domains 120, such as data indicating an outage in a particular region of the workload resource domain 120, a performance change affecting one or more nodes of a workload resource domain, or a change to a service level agreement (SLA) associated with a workload resource domain 120. In some examples, individual nodes within the deployed topology (e.g., network nodes, compute nodes, storage nodes, containers, software applications or services, virtual machine instances, etc.) may transmit event or performance data to the topology modification component 114. Additionally or alternatively, monitoring devices or systems within the workload resource domains 120 (e.g., network monitors, performance monitors, administrative systems, etc.) may monitor, aggregate, and transmit the event or performance data for the deployment, to the topology modification component 114. The event or performance data may be transmitted through the gateways and/or other edge computing devices of the workload resource domains 120, to the topology modification component 114, either on a periodic basis (e.g., every second, every 10 seconds, every minute, every hour, etc.) or when triggered by specific events (e.g., performance changes, software or system errors, support ticket creation, etc.), and may be different for different nodes within the deployment.

The topology modification component 114 may analyze the deployment modification data to determine whether the network topology model should be recomputed along with the modification to the deployment, or whether the recomputation of the network topology model should be delayed until a later time. As discussed above, an immediate recomputation of the network topology model may provide advantages in some instances of assuring that the network topology model maintains functional equivalence with the logical model. However, delaying or deferring the recomputation of the network topology model also may provide advantages in some instances by saving the significant computational resources required for a full recomputation of the model, and also may provide advantages for any potential outages and/or performance advantages on the actual deployment.

The analysis by the topology modification component 114, and subsequent determination of whether to recompute the network topology model or delay the recomputation, may be perform using various different techniques in different examples, which may be used individually or in any combination. In some examples, the analysis by the topology modification component 114 may include estimations/approximations of the complexity and/or scope of the modification to the deployment. For instance, the topology modification component 114 may compare an approximate complexity and/or scope of the modification to a threshold to determine whether to recompute the network topology model or delay the recomputation. For deployment modifications that are below a complexity or scope threshold, the topology modification component 114 may determine that such modifications are sufficiently simple, incremental and/or localized (e.g., functionally and/or geographically) that they are not likely to significantly impact operational performance or compromise the functional equivalence with the underlying logical model. Accordingly, for such modifications, the topology modification component 114 may delay recomputation of the network topology model and instead may store data representing the modification within a pending modifications listing associated with the model. To the contrary, deployment modifications that are above a complexity or scope threshold may be deemed by the topology modification component 114 likely to impact operational performance and/or compromise the functional equivalence with the underlying logical model. Accordingly, for sufficiently broad or complex modifications, the topology modification component 114 may determine that the network topology model should be recomputed immediately.

Certain analyses performed by the topology modification component 114 of deployment modifications may be rules-based analysis. For example, the topology modification component 114 may include a rules engine 202 configured to store and execute a rules-based analyses based on a set of predetermined and automated rules based on the deployment modification data. For instance, the topology modification component 114 may analyze the deployment modification to determine the number and types of nodes affected by the modification, the characteristics of the modified nodes, as well as the complexity of the modification, and then access the rules engine 202 to retrieve an execute rules based on the deployment modification data. Rules executed by the topology modification component 114 may be based on, for example, the numbers of nodes affected by the modification in the deployment, the types of the affected nodes, the locations of the affected nodes within the physical deployment, and/or any other node characteristics, in any combination thereof.

Figure 4:
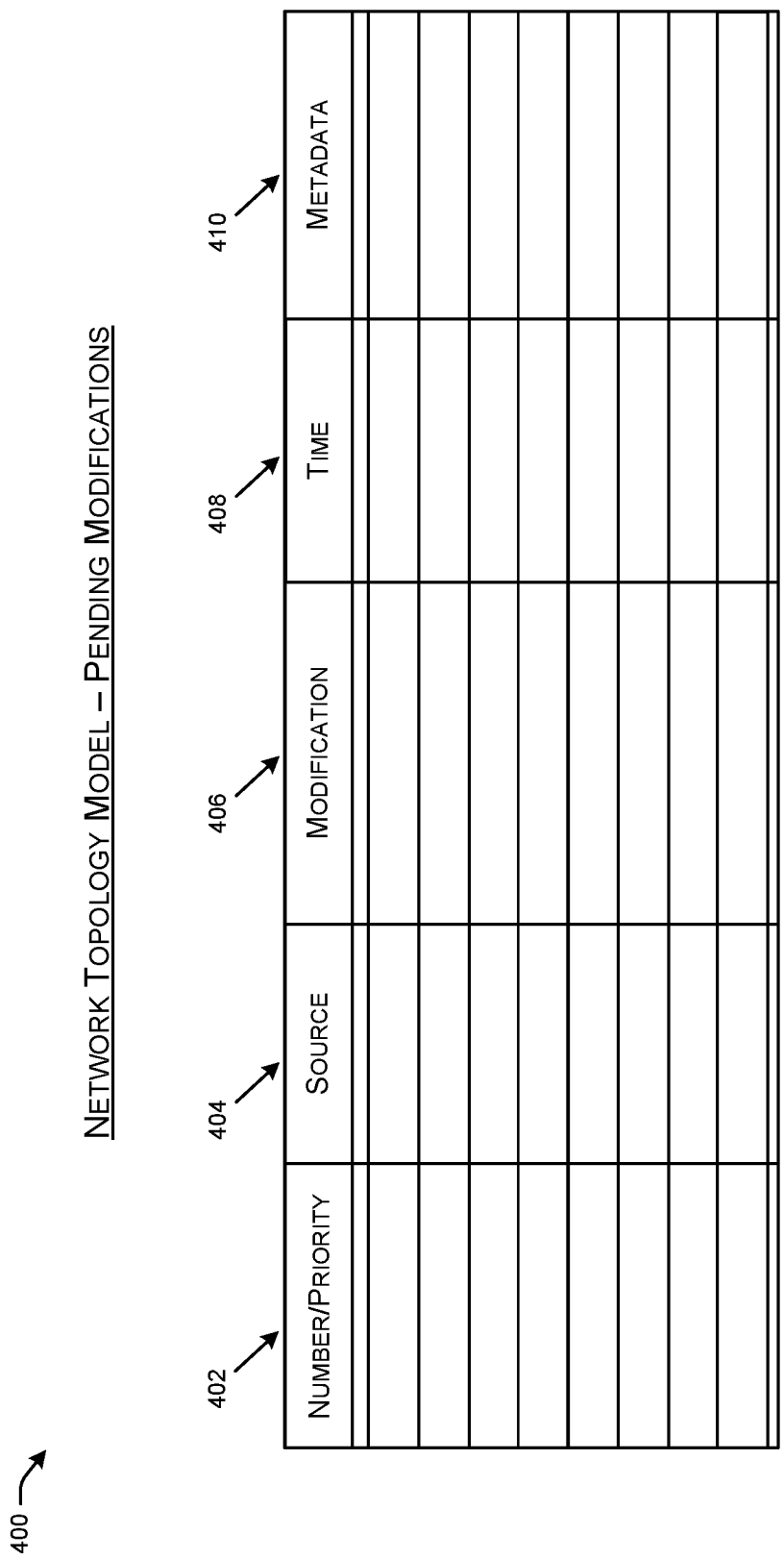
FIG. 4 depicts an example of a pending modification table associated with a network topology model.

In some examples, in response to a modification to the logical topology model input 206 and/or constraints 208, the topology modification component 114 may access a listing of node mappings between the nodes in the logical topology and the nodes in the formal network model and/or the physical deployment. Referring briefly to FIG. 4, a node mapping table 304 is depicted within the topology deployment system 110. In this example, a logical model 302 may be modified by a user (e.g., a tenant user or system administrator) via a user device 130. In response to detecting the modification of the logical model 302, the topology modification component 114 may access the node mapping table 304 to determine which physical nodes in the workflow resource domains 120 correspond to the affected node within the logical model 302. In some instances, a single node added, removed, or modified within the logical model 302 may be associated with multiple nodes in one or multiple of the workflow resource domains 120.

In addition to determining the nodes within the network deployment model and/or physical deployment that are affected by the modification, the topology modification component 114 may retrieve or determine the relevant characteristics for each of the affected nodes. In some examples, the relevant characteristics of a node in a deployment may include one or more of the estimated usage time of the node within the deployment, the type of node, and the subnet and region of the node within the deployment. For instance, the topology modification component 114 may weight modifications to certain node types differently than modifications to other node types, and may weight modifications within one region of the multi-pool environment of workload resource domains different that modifications within another region. By way of the example only, the topology modification component 114 may determine that container nodes are likely to have a shorter estimate usage time (or lifespan) within the deployment, and thus may weight modifications to container nodes less than modifications to other types of nodes. Additionally, the topology modification component 114 may determine and weight the type of modifications (e.g., node removal, addition, migration, etc.). By way of example, for a live migration of virtual machine nodes from one region of a workload resource domain to another, or even to a different workload resource domain, the topology modification component 114 may compare the underlying network models of the source and destination regions to determine differences or similarities (e.g., a likelihood that the network model extends the same L2 segment with an overlay), and may weight the modification less based on the assumption that the effect is relatively localized.

In some examples, the rules engine 202 may compare the deployment modification to a predetermined listing of modification types. In some instances, topology deployment system 110 may store one or more listings of types/characteristics of deployment modifications that should trigger recomputations of the network topology model, and/or deployment modifications that should trigger recomputations. In some instances, such lists may be defined manually by users (e.g., tenants, system administrators, etc.). In other instances, lists may be determined heuristics, for example, based on a trained machined-learned model. As an example scenario, a network topology may be deployed over (or span) multiple workflow resource domains 120, in which one or more container workloads are deployed on a compute node in a public cloud 120A, and in which the system 110 determines that a large amount of capacity has become available on an on-premise data center 120B. In this example, based on constraints 208 associated with lowering operating costs, the topology modification component 114 may migrate the container workloads from the public cloud 120A to the on-premise data center 120B. However, continuing this example, if one or more trained models 204 determines that the container workloads in the public cloud 120A are predicted to be short-lived, then one or more heuristics/rules within the rules engine 202 may determine that a potential recomputation of the formal model to migrate the container workloads might not be worthwhile based on the predicted short life cycle of the containers, and thus should be delayed or deferred.

Additionally or alternatively, when a modification to a deployment is initiated based on a user action (e.g., a change to the logical model input 206 or constraints 208), the topology deployment system 110 may receive metadata associated with the deployment modification. The metadata may include one more properties that allow the user that caused the deployment modification to specify whether or not the modification should trigger a recomputation of the formal model. In such examples, the topology modification component 114 may retrieve and analyze the metadata for the deployment modification, and may determine whether to recompute the network topology model or delay the recomputation based in part, or entirely, on the metadata.

In some examples, the analysis performed by the topology modification component 114 to determine whether to recompute the network topology model or delay the recomputation, can be based not only on the current deployment modification, but also based on one or more previous deployment modifications that have been made since the most recent recomputation of the network topology model. As noted above, if the topology modification component 114 determines that the recomputation should not be immediately performed, it may store and track the deployment modification in a pending modification listing. Referring briefly to FIG. 4, an example is depicted of a pending modification table associated with a network topology model. In this example, each modification to the deployed network topology that does not trigger a recomputation of the network topology model may be stored in the pending modification table 400. In this example, the pending modification table 400 may store, for each deployment modification, a number or priority 402 associated with the modification, a source 404 of the modification, a description or specification of the modification 406, a time 408 associated with the modification, and metadata 410 associated with the modification. In other examples, different fields and/or labels may be stored associated with pending modifications, so that when the system drifts from a previously verified state the listing records and tracks all changes from that previously verified state forward, so that all of the pending modifications can be reconciled back into the model the next time the formal network topology model is recomputed.

As shown in FIG. 4, the time 408 associated with the modification with the modification may be tracked so that, when the pending modification list 400 is retrieved and used to recompute the network deployment model, the modifications may be applied in the correct chronological order. However, in some examples, the topology modification component 114 might not use the chronological order defined by time 408, but may determine an updated order that may be indicated in the number/priority data 402. Changes to the order for the pending modification list 400 may be determined based on predetermined rules within the rules engine 202, based on requests from users (e.g., tenants or system administrators) via user devices 130, and/or based on metadata received or associated with the deployment modifications. When the order for a set of deployment modifications is updated using number/priority 402, to something different than the chronological order based on time 408, the updated order may determine the order in which the modifications are applied to the network topology model and/or which modifications in the pending modification list 400 may overrule or take priority over other modifications.

Thus, during an analysis of a current modification to a network topology, the topology modification component 114 also may retrieve and analyze one or more previous modifications from a pending modification table 400. In some examples, the topology modification component 114 may determine whether to recompute the network topology model or delay the recomputation based at least in part on a sum of the modifications in the pending modification table 400. For instance, the topology modification component 114 may initiate a recomputation when the number of modifications in the pending modification table 400 is greater than a threshold number (N). In some examples, the topology modification component 114 may aggregate the functionality of the modifications and perform an analysis on the scope and complexity of the aggregated modification. For instance, a current modification to the network topology may reduce the impact or may entirely cancel a previous modification within the pending modification table 400. By way of illustration only, if a first deployment modification migrated a set of nodes from a first environment to a second environment, then a subsequent second deployment modification migrated the same set of nodes back to the first environment, these modifications may be said to cancel each other out. In this way, when a subsequent modification that cancels out or reduces in scope/complexity one or more previous modifications, topology modification component 114 may recognize the canceling or reducing affect during the analyze and down weight the combination of modifications making it less like that the topology modification component 114 will initiate a recomputation of the network topology model.

As shown in this example, the topology modification component 114 also may include one or more trained machine-learned models 204 (and/or machine learning algorithms to train and execute the models 204), to be used in the analysis of the modification to the deployed network topology. For instance, the machine-learned models 204 may be trained based on training data that includes previous modifications to similar network topology deployments, along with the corresponding results observed based on the modifications. For instance, the observed results from a previous deployment modification may include whether or not (or to what extent) the deployment maintained functional equivalence with the logical model input 206, whether or not (or to what extent) the deployment maintained compliance with the constraints, and/or what performance or cost impacts were observed following the previous modifications. Following the model training process, the trained machine-learned models 204 may correspond to set or listing of modifications (or characteristics of modifications) for which the network topology model should be recomputed.

By way of example, the characteristics of a first deployment modification (e.g., nodes affected, node types and locations, surround nodes and computing architectures, etc.) may be correlated with similar previous deployment modifications that had a relatively high impact on reducing functional equivalence with the logical model, and model performance. In this case, the topology modification component 114 may execute the appropriate trained machine-learned models 204, using the characteristics of the first deployment modification as input to the trained machine-learned model(s) 204, to determine that the first deployment modification should trigger a recomputation of the network topology model. In a contrasting example, the characteristics of a second deployment modification may be correlated with similar previous deployment modifications that had a relatively low impact on reducing functional equivalence with the logical model, and model performance. In this case, the topology modification component 114 may execute the appropriate trained machine-learned models 204, using the characteristics of the second deployment modification as input to the trained machine-learned model(s) 204, to determine that the second deployment modification should not trigger an immediate recomputation of the network topology model.

After analyzing the received data for the modification to the deployed network topology, the topology modification component 114 may determine that the network topology model should be recomputed based on the modification, or that the recomputation should be delayed. When determining that the network topology model should be recomputed, the topology modification component 114 may initiate the recomputation via the model generation component 112 and deployment generation component 116, using processes similar to those discussed above for the initial generation and deployment of the network topology. However, in this example, the generation of the updated network topology model may be based on the deployment modification as well as one or more additional deployment modifications retrieved from the pending modification table 400. In contrast, when determining that the recomputation of the network topology model should be delayed, the topology modification component 114 may add the current deployment modification to the pending modification table 400. Additionally, in this instance the topology modification component 114 need not initiate a new model generation via the model generation component 112, but instead may only instruct the deployment generator to make the physical changes to the multi-pool deployment without a corresponding change to the network topology model.

Figure 5:
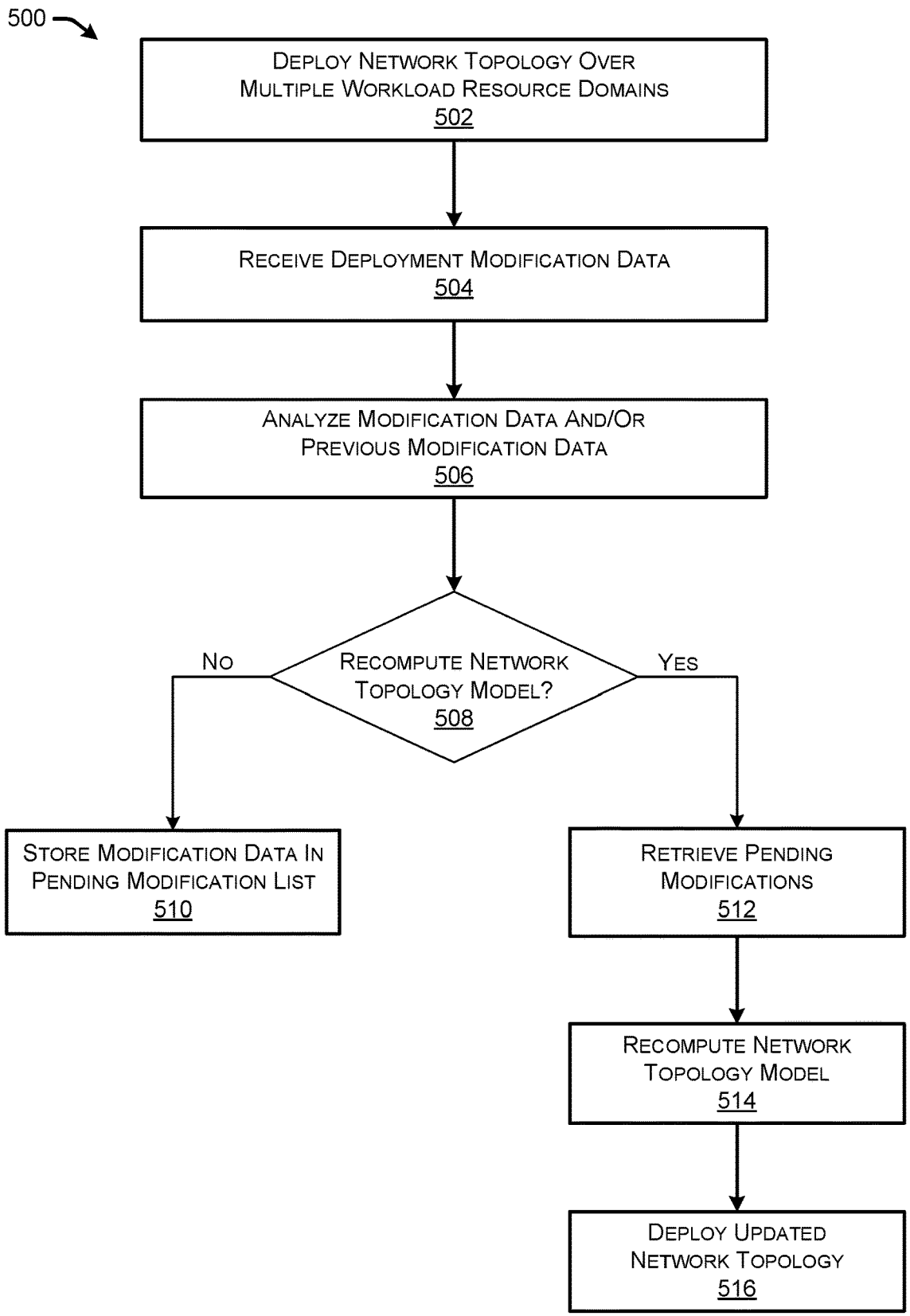
FIG. 5 depicts an example process for receiving and processing a modification to a deployed network topology.

FIG. 5 is a flow diagram depicting an example method 500 for receiving and processing a modification to a deployed network topology. As described above, a topology modification component 114 may analyze one or more modifications to a deployment, to determine whether to recompute the network topology model or delay the recomputation. In some embodiments, method 500 may be performed by a system including the topology deployment system 110 and/or the topology modification component 114 described herein.

At operation 502, a network topology may be initially deployed over a multi-pool environment comprising multiple workload resource domains 120. As discussed above, the network topology model may be generated based on a logical model input 206, constraints 208, and/or resource inventories 210, and the physical deployment of the network topology may be performed based on the model, using deployment instructions issued by a deployment generation component 116 to the workload resource domains 120.

At operation 504, the topology modification component 114 may receive deployment modification data associated with the deployed network topology. The modification data received at operation 504 may be based on changes made by a user (e.g., a tenant, system administrator, cloud or resource pool administrator, etc.) to the associated logical topology model, or to the constraints that have been defined for the topology. In other instances, the modification data may be received from one or more workload resource domain(s) 120, based on events (e.g., node or region outage, performance issue detected, etc.) occurring with the workload resource domains 120, or a change to a service level agreement (SLA) associated with a workload resource domain 120 and one or more tenants.

At operation 506, topology modification component 114 may analyze the data relating to the modification of the deployed network topology and/or data relating to modifications previously made to the deployed network topology. The analyses at operation 506 may include any of analyses techniques describe above, including but not limited to the rules-based determinations, trained machine-learning models, user-defined lists of association types/characteristics, metadata associated with deployment modifications, and/or any combination thereof. The analyses at operation 506 also may be based on the deployment modification data received at 504, and/or based on modification data for previous deployment modifications stored in a pending modification table 600.

At operation 508, topology modification component 114 may determine whether to recompute the network topology model, or to delay the recomputation until a later time. As discussed above, the determination at 508 may be based on the various analysis techniques described herein. In some examples, a configurable threshold and/or tuning variable may be used in the determination at 508, to allow a user (e.g., tenant or system administrator) to weight the determination by any factor, either in favor of immediate recomputation of the network topology model or in favor of delay.

At operation 510, if the topology modification component 114 determines that the recomputation of the network topology model is to be delayed (508:No), then the topology modification component 114 may store some the deployment modification data in the pending modification table 600 to be applied in a subsequent recomputation of the network topology model.

At operation 512, if the topology modification component 114 determines that the network topology model is to be recomputed (508:Yes), then the topology modification component 114 may retrieve the modification data from the pending modification table 600, for any previous deployment modifications that have been made since the most recent recomputation of the network topology model.

At operation 514, the topology modification component 114 may initiate the recomputation of the network topology model using the model generation component 112. Then, at operation 516, the topology deployment system 110 may initiate updating the physical deployment of the network topology, based on the network topology model recomputed at operation 514. The recomputation of the network topology model and updating of the physical deployment of the network topology at operations 514 and 516 may be performed using processes similar to those discussed above for the generation and deployment of the network topology.

Figure 6:
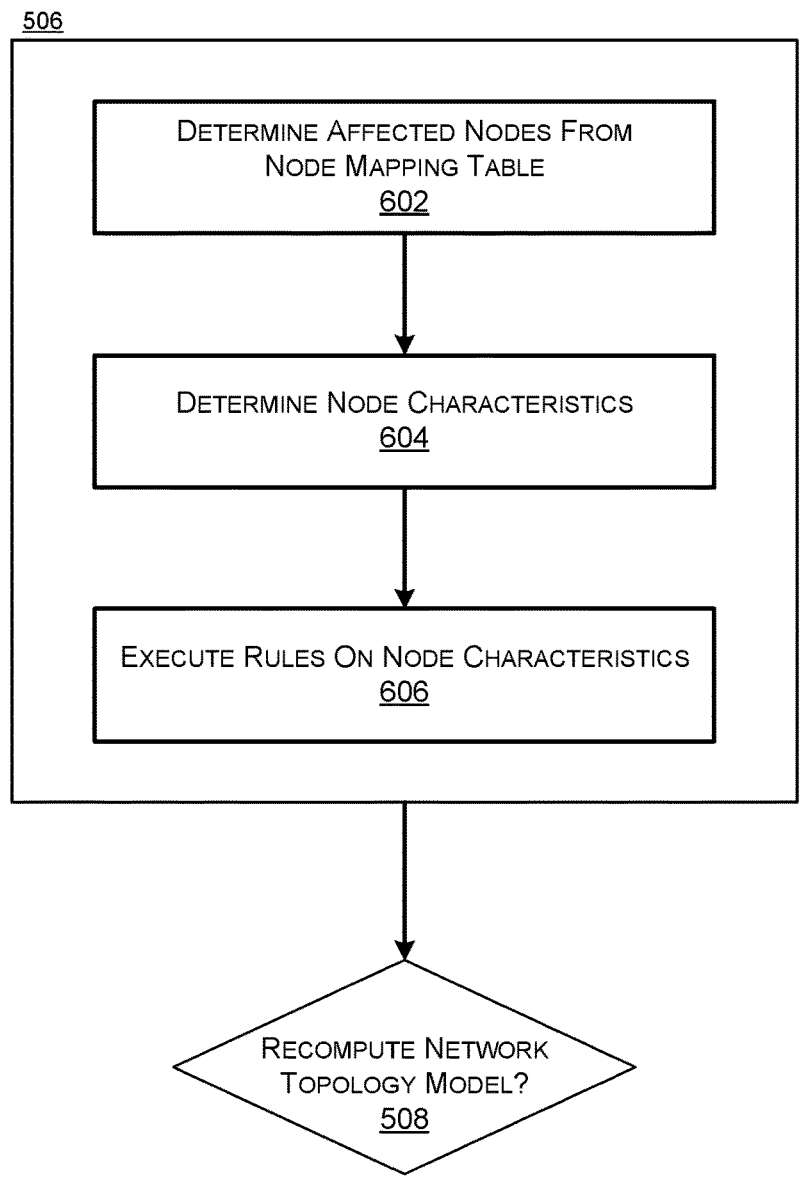
FIG. 6 depicts an example process for analyzing a modification to a deployed network topology using a rules engine.
Figure 7:
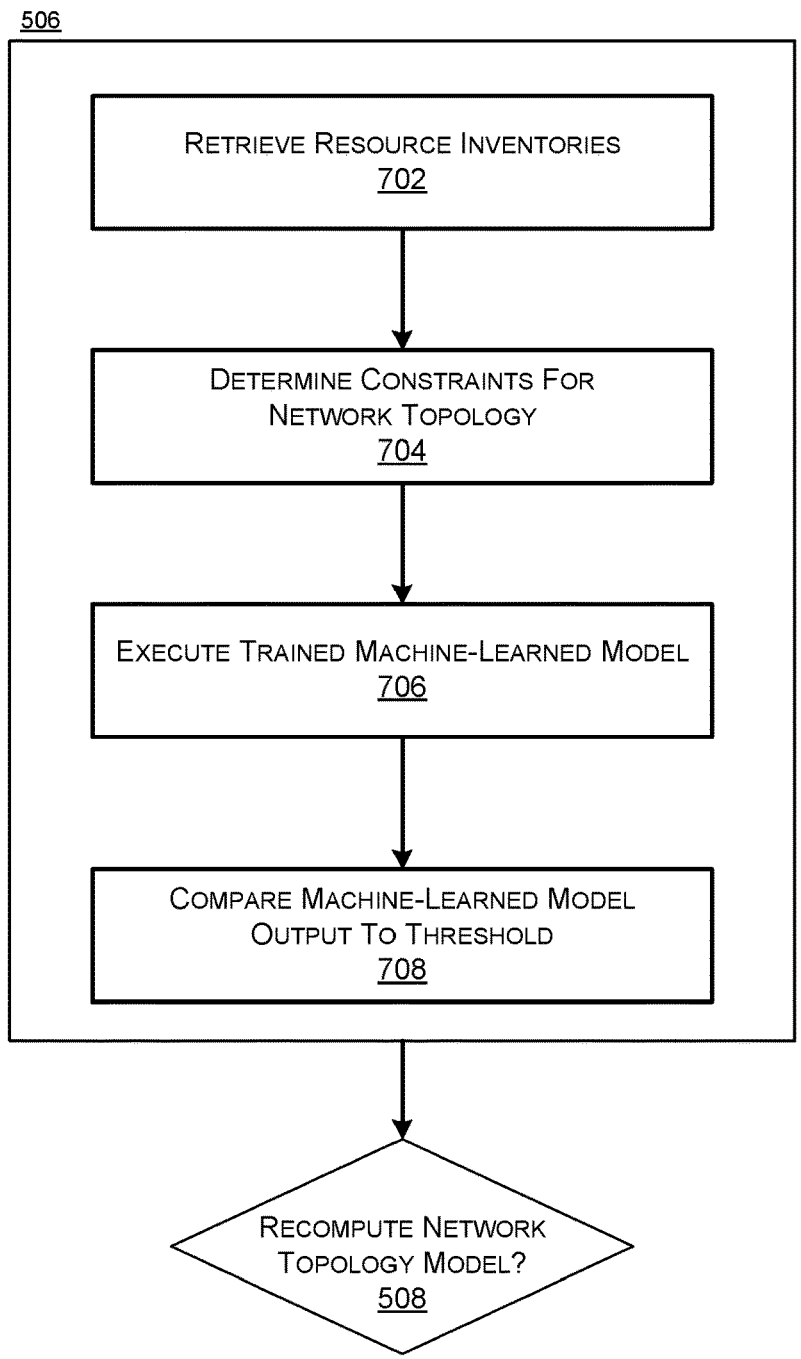
FIG. 7 depicts an example process for analyzing a modification to a deployed network topology using a trained machine-learned engine.

FIGS. 6 and 7 depict two different example processes that use different techniques for analyzing a modification to a deployed network topology. In FIG. 6, a rules-based technique is used to analyze a deployment modification at operation 506, for determining at operation 508 whether to recompute the network topology model or delay the recomputation. In FIG. 6, at operation 602, the topology modification component 114 may determine a set of nodes with the network topology deployment affected by the modification. In some examples, operation 602 may include accessing a node mapping table 304, to retrieve a set of affected nodes within the deployment based on the node(s) modified within the logical model input 206. Additionally as discussed above, operation 602 may include determining not only the nodes directly affected by the deployment modification, but also any nodes indirectly affected (e.g., within the same deployment, or a different deployment which may be for a different tenant and/or within a different workload resource domain), and/or any nodes from previous deployment modifications (e.g., within the pending modification table 600).

At operation 604, a set of characteristics may be retrieved and/or determined for each of affected nodes determined in operation 602. For example, the topology modification component 114 may retrieve, for each of the deployment nodes determined in operation 602, one or more of a node type, estimated usage time of the node within the deployment, a workflow resource domain, region, and/or subnetwork of the node, etc.

At operation 606, a rules engine 202 may execute one or more rules based on the node characteristics determined at operation 604. The rules executed at operation 606 may include any of the various types of rules described herein, and may be used in any order or combination by the topology modification component 114.

Following the execution of the rules at 606, the determination of whether to recompute the network topology model or delay the recomputation at operation 508 may be performed based on the output from the rules executed at operation 606. In some examples, a configurable rules score threshold may be used to allow the determination at operation 508 to be weighted or tuned by any factor, either in favor of immediate recomputation of the network topology model or in favor of delay.

In FIG. 7, in contrast to the rules-based technique in FIG. 6, a trained machine-learned model-based technique is used to analyze the deployment modification at operation 506. In FIG. 7, at operation 702, which may be optional in some embodiments, the topology modification component 114 may determine resource inventories for the applicable workload resource domains 120.

At operation 702, which may be optional in some embodiments, the topology modification component 114 may determine resource inventories for the applicable workload resource domains 120.

At operation 704, which also may be optional in some embodiments, the topology modification component 114 may determine one or more deployment constraints predefined for the deployed network topology.

At operation 706, the topology modification component 114 may access and execute one or more trained machine-learning models 204. As described above, the topology modification component 114 may input into the trained models 204 one or more of the deployment modification data, the resource inventory data determined at operation 702, and/or the constraint data determined at operation 704, and any machine-learning model and techniques may be used.

At operation 708, the output from the trained machine-learn model at operation 706 may be compared to a threshold, as part of the determination of whether to recompute the network topology model or delay the recomputation at operation 508. In some examples, the threshold may be a configurable threshold allowing users to weight or tune the determination at operation 508 by any factor, either in favor of immediate recomputation of the network topology model or in favor of delay.

Figure 8:
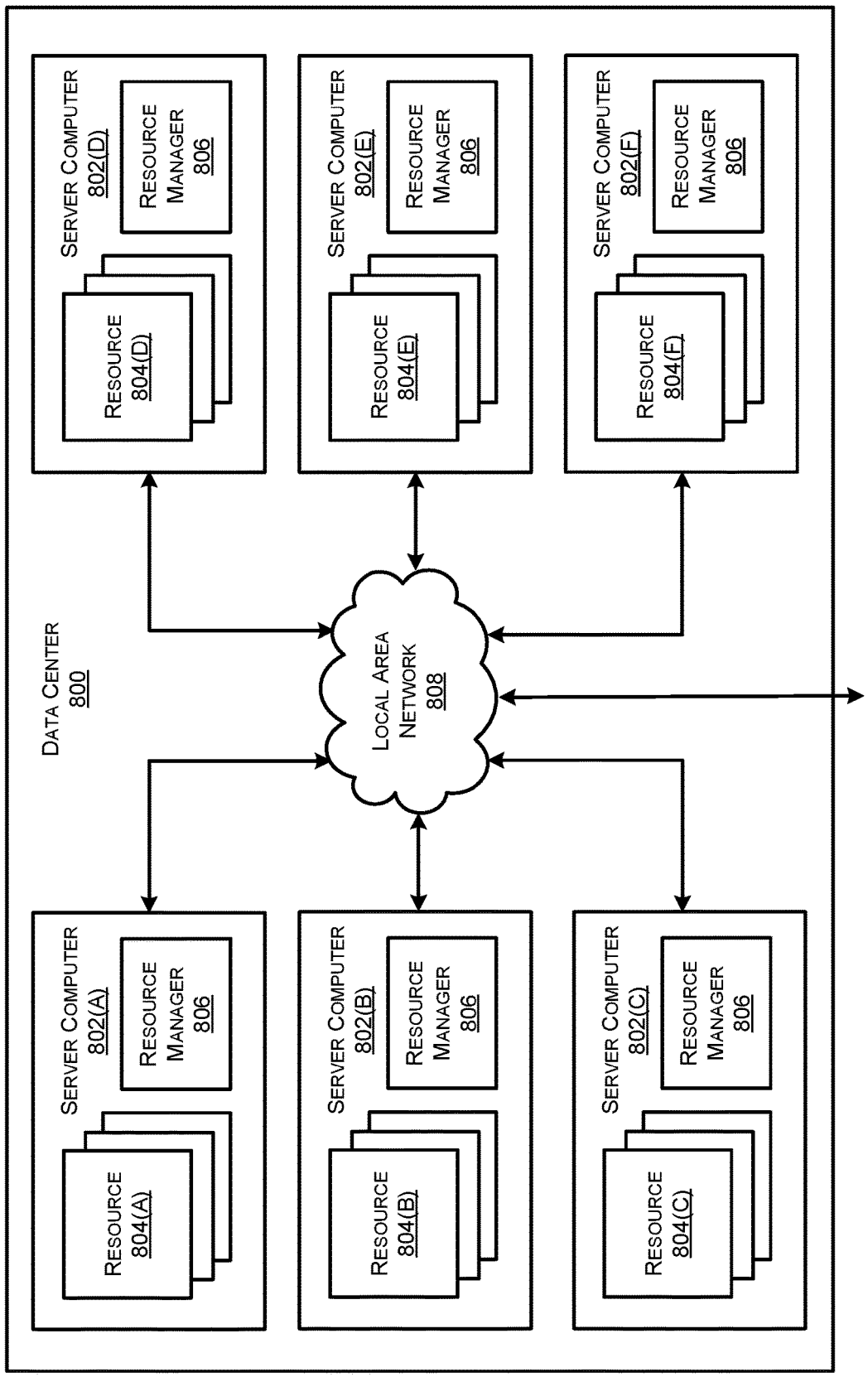
FIG. 8 illustrates a computing system diagram illustrating a configuration for a data center that can be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, any of the computing devices, systems, or components described herein. For examples, a workload resource domain 120 may be implemented using one or more of a data center 800. Additionally or alternatively, a server computer 802 may correspond any or all of the components of the topology deployment system 110 described herein (e.g., the model generation component 112, topology modification component 114, and/or deployment generation component 116), and/or any other computing devices included in the computing environment 100. Although described as server computers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized. In some examples, the server computers 802 may each execute one or more application containers and/or virtual machines to perform techniques described herein.

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations.

Figure 9:
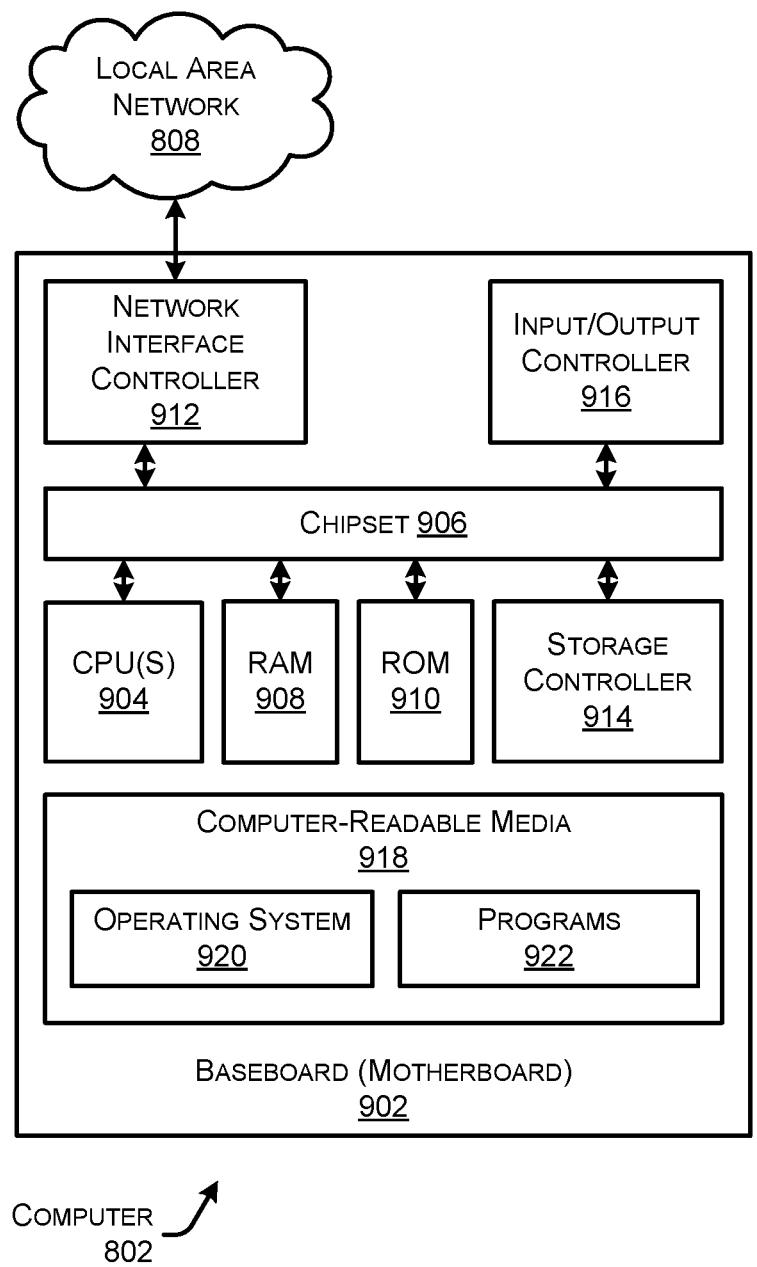
FIG. 9 is a computer architecture diagram showing an illustrative computer hardware architecture for implementing a server device that can be utilized to implement aspects of the various technologies presented herein.

FIG. 9 shows an example computer architecture for a server computer 802 capable of executing program components for implementing the functionality described above. The computer architecture shown in FIG. 9 may correspond to a conventional server computer, workstation, desktop computer, laptop, tablet, network appliance, e-reader, smartphone, or other computing device, and can be utilized to execute any of the software components presented herein. In some examples, a server computer 802 may be used to implement the topology deployment system 110 and/or any of the separate computing devices, systems, or components of the topology deployment system 110 described herein (e.g., the model generation component 112, topology modification component 114, and/or deployment generation component 116), and/or may be used to implement user device(s) 130. Although not shown in this example, the server computer 802 may comprise network devices such as servers, switches, routers, hubs, bridges, gateways, modems, repeaters, access points, etc.

The server computer 802 may correspond to any of the computing devices, systems, or components of the topology deployment system 110 described herein. In some examples, the server computer 802 may be configured to perform, potentially in conjunction with other server computers, some or all of the operations of the topology deployment system 110.

The computer 802 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 802.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 802. The chipset 906 can further provide an interface to a computer-readable storage medium such as a read-only memory ("ROM") 910 or non-volatile RAM ("NVRAM") for storing basic routines that help to startup the computer 802 and to transfer information between the various components and devices. The ROM 910 or NVRAM can also store other software components necessary for the operation of the computer 802 in accordance with the configurations described herein.

The computer 802 can operate in a networked environment using logical connections to remote computing devices and computer systems through a network, such as the network 808. The chipset 906 can include functionality for providing network connectivity through a NIC 912, such as a gigabit Ethernet adapter. The NIC 912 is capable of connecting the computer 802 to other computing devices over the network 808 (and/or 102). It should be appreciated that multiple NICs 912 can be present in the computer 802, connecting the computer to other types of networks and remote computer systems.

The computer 802 can be connected to a storage device 918 that provides non-volatile storage for the computer. The storage device 918 can store an operating system 920, programs 922, and data, which have been described in greater detail herein. The storage device 918 can be connected to the computer 802 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 802 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 802 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 802 can further read information from the storage device 918 by detecting the physical states or characteristics of one or more particular locations within the physical storage units.

In addition to the mass storage device 918 described above, the computer 802 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 802.

In some examples, the operations performed by the topology deployment system 110 and/or any components included therein, may be supported by one or more devices similar to computer 802. Stated otherwise, some or all of the operations performed by the topology deployment system 110 and or any components included therein, may be performed by one or more computer devices 802 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 802. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 918 can store other system or application programs and data utilized by the computer 802.

In one embodiment, the storage device 918 or other computer-readable storage media is encoded with computer-executable instructions which, when loaded into the computer 802, transform the computer from a general-purpose computing system into a special-purpose computer capable of implementing the embodiments described herein. These computer-executable instructions transform the computer 802 by specifying how the CPUs 904 transition between states, as described above. According to one embodiment, the computer 802 has access to computer-readable storage media storing computer-executable instructions which, when executed by the computer 802, perform the various processes described above in reference to FIGS. 1-7. The computer 802 can also include computer-readable storage media having instructions stored thereupon for performing any of the other computer-implemented operations described herein.

The computer 802 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 802 might not include all of the components shown in FIG. 9, can include other components that are not explicitly shown in FIG. 9, or might utilize an architecture different than that shown in FIG. 9.

As described herein, the computer 802 may comprise any of the network devices 106 described herein. The computer 802 may include one or more hardware processors 904 (processors) configured to execute one or more stored instructions. The processor(s) 904 may comprise one or more cores. Further, the computer 802 may include one or more network interfaces configured to provide communications between the computer 802 and other devices, such as the communications described herein as being performed by the topology deployment system 110, the user device(s) 130, and/or the workload resource domain(s) 120. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure performed by the topology deployment system 110, the user device(s) 130, and/or the workload resource domain(s) 120. For instance, the programs 922 may cause the computer 802 to perform techniques for generating and modification network topology models and associated network topologies within one or more workload resource domain(s) 120.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing computer-executable instructions that, when executed by the one or more processors, perform operations comprising:
   receiving data identifying a first modification to a network topology deployed across a plurality of workload resource domains, wherein the network topology is based on a network topology model, and wherein the network topology comprises a plurality of nodes including at least one node operating in each of the plurality of workload resource domains;
   determining, based at least in part on an analysis of the first modification, that the network topology model is not to be recomputed in connection with the first modification to the deployed network topology; and
   based on the determination that the network topology model is not to be recomputed, storing data representing the first modification in a listing of pending modifications to the network topology model.

2. The system of claim 1, the operations further comprising:
   receiving data identifying a second modification to the deployed network topology;
   determining, based at least in part on an analysis of the second modification, that the network topology model is to be recomputed in connection with the second modification to the deployed network topology; and
   based on the determination that the network topology model is to be recomputed:
   retrieving the data representing the first modification from the listing of pending modifications to the network topology model; and
   recomputing the network topology model, based at least in part on the first modification and the second modification.

3. The system of claim 2, wherein the determination that the network topology model is to be recomputed is based on the analysis of the first modification and the analysis of the second modification.

4. The system of claim 1, wherein the analysis of the first modification comprises comparing the first modification to a predetermined list of network topology modification types.

5. The system of claim 4, the operations further comprising:
   generating the predetermined list of network topology modification types, using a machine-learned model trained to identify a network topology modification type associated with an operational performance change of the deployed network topology.

6. The system of claim 1, wherein the first modification to the deployed network topology is associated with a first user requesting the first modification, and wherein the operations further comprise:
   receiving metadata provided by the first user, associated with the first modification to the deployed network topology,
   wherein the determination that the network topology model is not to be recomputed is based at least in part on the metadata provided by the first user.

7. The system of claim 1, wherein the network topology model is associated with a logical topology model comprising a plurality of logical nodes, and wherein the operations further comprise:
   receiving a modification to a first logical node of logical topology model; and
   determining, using a node mapping between the logical topology model and the network topology model, a first node of the network topology model associated with the first modification,
   wherein the determination that the network topology model is not to be recomputed is based at least in part on the first node of the network topology model associated with the first modification.

8. The system of claim 1, the operations further comprising:
determining a first node of the network topology model associated with the first modification;
determining an estimated usage time of the first node within the deployed network topology; and
determining a subnetwork of the first node within the deployed network topology,
wherein the determination that the network topology model is not to be recomputed is based on at least one of the estimated usage time of the first node within the deployed network topology, or the subnetwork of the first node within the deployed network topology.

9. The system of claim 1, wherein receiving the data identifying the first modification comprises at least one of:
detecting a resource outage in a first workload resource domain, the resource outage including a first node of the deployed network topology;
receiving, from a user device, a modification to a logical topology model associated with the network topology model;
receiving, from the user device, a modification to a deployment constraint associated with the network topology model; or
receiving data identifying a change to a service level agreement associated with a first workload resource domain of the plurality of workload resource domains.

10. A method comprising:
receiving, by a computer system, data identifying a first modification to a network topology deployed across a plurality of workload resource domains, wherein the network topology is based on a network topology model, and wherein the network topology comprises a plurality of nodes including at least one node operating in each of the plurality of workload resource domains;
determining, by the computer system, based at least in part on an analysis of the first modification, that the network topology model is not to be recomputed in connection with the first modification to the deployed network topology; and
storing, by the computer system, data representing the first modification in a listing of pending modifications to the network topology model, based on the determination that the network topology model is not to be recomputed.

11. The method of claim 10, further comprising:
receiving data identifying a second modification to the deployed network topology;
determining, based at least in part on an analysis of the second modification, that the network topology model is to be recomputed in connection with the second modification to the deployed network topology; and
based on the determination that the network topology model is to be recomputed:
retrieving the data representing the first modification from the listing of pending modifications to the network topology model; and
recomputing the network topology model, based at least in part on the first modification and the second modification.

12. The method of claim 11, wherein the determination that the network topology model is to be recomputed is based on the analysis of the first modification and the analysis of the second modification.

13. The method of claim 10, wherein the analysis of the first modification comprises comparing the first modification to a predetermined list of network topology modification types.

14. The method of claim 13, further comprising:
generating the predetermined list of network topology modification types, using a machine-learned model trained to identify a network topology modification type associated with an operational performance change of the deployed network topology.

15. The method of claim 10, wherein the first modification to the deployed network topology is associated with a first user requesting the first modification, and wherein the operations further comprise:
receiving metadata provided by the first user, associated with the first modification to the deployed network topology,
wherein the determination that the network topology model is not to be recomputed is based at least in part on the metadata provided by the first user.

16. The method of claim 10, wherein the network topology model is associated with a logical topology model comprising a plurality of logical nodes, and wherein the operations further comprise:
receiving a modification to a first logical node of logical topology model; and
determining, using a node mapping between the logical topology model and the network topology model, a first node of the network topology model associated with the first modification,
wherein the determination that the network topology model is not to be recomputed is based at least in part on the first node of the network topology model associated with the first modification.

17. The method of claim 10, further comprising:
determining a first node of the network topology model associated with the first modification;
determining an estimated usage time of the first node within the deployed network topology; and
determining a subnetwork of the first node within the deployed network topology,
wherein the determination that the network topology model is not to be recomputed is based on at least one of the estimated usage time of the first node within the deployed network topology, or the subnetwork of the first node within the deployed network topology.

18. The method of claim 10, wherein receiving the data identifying the first modification comprises at least one of:
detecting a resource outage in a first workload resource domain, the resource outage including a first node of the deployed network topology;
receiving, from a user device, a modification to a logical topology model associated with the network topology model;
receiving, from the user device, a modification to a deployment constraint associated with the network topology model; or
receiving data identifying a change to a service level agreement associated with a first workload resource domain of the plurality of workload resource domains.

19. A non-transitory computer-readable medium storing processor-executable instructions that, when executed by one or more processors, cause the one or more processors to perform operations comprising:
receiving data identifying a first modification to a network topology deployed across a plurality of workload resource domains, wherein the network topology is based on a network topology model, and wherein the network topology comprises a plurality of nodes including at least one node operating in each of the plurality of workload resource domains;

determining, based at least in part on an analysis of the first modification, that the network topology model is not to be recomputed in connection with the first modification to the deployed network topology; and storing data representing the first modification in a listing of pending modifications to the network topology model, based on the determination that the network topology model is not to be recomputed.

20. The non-transitory computer-readable medium of claim 19, the operations further comprising:

receiving data identifying a second modification to the deployed network topology;

determining, based at least in part on an analysis of the second modification, that the network topology model is to be recomputed in connection with the second modification to the deployed network topology; and based on the determination that the network topology model is to be recomputed:
  retrieving the data representing the first modification from the listing of pending modifications to the network topology model; and
  recomputing the network topology model, based at least in part on the first modification and the second modification.

* * * * *